United States Patent [19]

Johnson

[11] Patent Number: 5,711,840
[45] Date of Patent: Jan. 27, 1998

[54] METHOD OF MAKING ABRASIVE ARTICLES

[75] Inventor: Jeffrey Steven Johnson, Ivoryton, Conn.

[73] Assignee: Northeast Abrasives, Diamond and Tools Corp., Essex, Conn.

[21] Appl. No.: 299,942

[22] Filed: Sep. 2, 1994

Related U.S. Application Data

[62] Division of Ser. No. 848,331, Mar. 9, 1992, Pat. No. 5,366,800.

[51] Int. Cl.⁶ ............................................. B32B 7/14
[52] U.S. Cl. ..................... 156/291; 156/256; 156/285; 156/290; 156/301; 51/295; 51/299; 51/400
[58] Field of Search .................... 428/281; 51/600, 51/395, 402, 398, 297, 295, 293, 298, 399; 156/237, 239, 256, 295, 298, 301, 285, 292, 291

[56] References Cited

U.S. PATENT DOCUMENTS

| | | |
|---|---|---|
| 334,671 | 1/1886 | Laughton . |
| 2,055,410 | 9/1936 | Hurst . |
| 2,055,411 | 9/1936 | Hurst . |
| 2,121,496 | 6/1938 | Bowen et al. . |
| 2,284,738 | 6/1942 | Hurst . |
| 2,284,739 | 6/1942 | Hurst ........................................ 51/400 |
| 2,369,462 | 2/1945 | Hurst ........................................ 51/400 |
| 2,375,263 | 5/1945 | Upper . |
| 2,378,386 | 6/1945 | Baumgartner . |
| 2,405,524 | 8/1946 | Sharpe et al. . |
| 2,540,112 | 2/1951 | Goepfert et al. . |
| 2,768,483 | 10/1956 | Hurst . |
| 4,018,574 | 4/1977 | Dyer ........................................ 51/295 |
| 4,355,489 | 10/1982 | Heyer et al. ........................... 51/400 |
| 4,486,200 | 12/1984 | Heyer et al. ........................... 51/295 |

*Primary Examiner*—Merrick Dixon
*Attorney, Agent, or Firm*—Robert H. Montgomery

[57] ABSTRACT

A method of making abrasive articles which includes the steps of sandwiching and adhering abrasive particles between two sheets of fiber where the particles have a major cross-section dimension greater than the thickness of the sheets into resultant second sheets. The resultant second sheets are then adhered together by lamination under pressure so that the abrasive particles of a second sheet enter the interstices between the abrasive particles of adjacent other second sheets to form an interlocking bond and increase the tensile strength. The sheets are preferably cut from a processed strip prior to lamination. Prior to lamination the second sheets may be coated with one or both of a liquid rubber and a thermosetting resin. If resin is used the stack is heated as it is pressure laminated. The application of rubber and resin may be in the alternative. The application of rubber imparts flexibility while the resin upon curing imparts hardness. There may be a compromise between the two to reach a desired degree of flexibility or hardness.

14 Claims, 4 Drawing Sheets

METHOD OF MAKING ABRASIVE ARTICLES

RELATED APPLICATION

This application is a division of application Ser. No. 07/848,331 filed Mar. 9, 1992, now U.S. Pat. No. 5,366,800.

FIELD OF THE INVENTION

This invention relates to abrasive articles and a method of making the same.

BACKGROUND OF THE INVENTION

Abrasive materials of the type to which this invention is directed may consist of a textile substance or fabric of the same, a filler consisting of cutting and polishing abrasive grains or powders and a binder which will bind the filler particles to the textile substance. This combination is disclosed as used to form buffing and polishing wheels is disclosed in early U.S. Pat. No. 334,671, but without abrasive particles.

A typical abrasive material is disclosed in U.S. Pat. No. 2,284,738 which discloses an abrasive article comprising a fibrous web formed from a plurality of carded fibrous membranes where the individual fibers are stated to be interwoven and forming interstices therebetween. The interstices are abrasive grains and are bonded to the web with a suitable adhesive.

Generally speaking abrasive or polishing tools of the type to which this invention relates includes layer of fibrous body impregnated with a binder or adhesive. The layers may then be laminated together to form a disc as disclosed in U.S. Pat. No. 2,121,496. The various layers are formed of a carded fiber impregnated with a binder, and then a plurality or multiplicity of layers are laminated to form the finished product.

In forming the product of U.S. Pat. No. 2,121,496 the bonded layers of carded fiber are laminated to form a product of predetermined dimension.

U.S. Pat. No. 2,284,738 discloses an abrasive material in which abrasive particles are bonded in the spaces between carded fibres. The resulting layers are bonded together to from the resulting product. The methods by which the initial abrasive article is formed are disclosed in U.S. Pat. Nos. 2,055,410 and 2,055,411 and also other methods are disclosed in U.S. Pat. Nos. 2,055,410 and 2,055,411. The disclosures of which are incorporated herein as examples of prior art.

Abrasive tools as known in the prior art have a limited tensile strength. Grinding discs as shown in the prior art have a limited resistance to flying apart at high speeds of rotation.

Accordingly, the present invention provides a new and improved abrasive tool having a greater tensile strength. In particular, the present invention provides an abrasive tool of high tensile strength which will permit greater speeds of rotation.

Another object of this invention is to provide a new and improved abrasive material of increased tensile strength for use in grinding and polishing wheels as well as other abrasive items such as rods, sticks, deburring wheels and points.

A further object of this invention is to provide a new and improved method of making abrasive materials and new and improved abrasive articles which are useful for grinding and polishing wheels, grinding rods and sticks and deburring wheels and points.

SUMMARY OF THE INVENTION

Briefly stated, the invention in one form thereof comprises a grinding material or product which may utilized in different forms and comprises layers which interlock with each other when laminated to provide greater tensile strength. Layers of the basic material are formed by sandwiching abrasive particles between two layers of pre-bonded carded fiber which are bonded together. One sheet of a layer is initially passed through an adhesive and later spread in a controlled fashion with abrasive particles. The abrasive particles form interstices therebetween. A second sheet of the combed fiber is passed together with the first sheet through a pair of nip rolls which compress the two sheets together with the abrasive particles therebetween and provide a first layer of adhered sheets with the abrasive particles therebetween.

Subsequently, the resulting layer may be cut into sections and a plurality or multiplicity laminated theretogether for a desired final thickness in the lamination step. Sufficient pressure is applied that the abrasive particles of each layer will enter the interstices of the abrasive particles of adjacent layers and form an interlocking relationship therebetween which significantly increases the tensile strength of the material by virtue of such interlocking of the abrasive particles to provide a superior product.

The features of the invention which are believed to be novel are particularly pointed out and distinctly claimed in the concluding portion of this specification. The invention, however, together with further objects and advantages thereof may best be appreciated by reference to the following detailed description taken In conjunction with the drawings.

DETAILED DESCRIPTION OF PREFERRED EMBODIMENTS OF THE INVENTION

Figure 1:
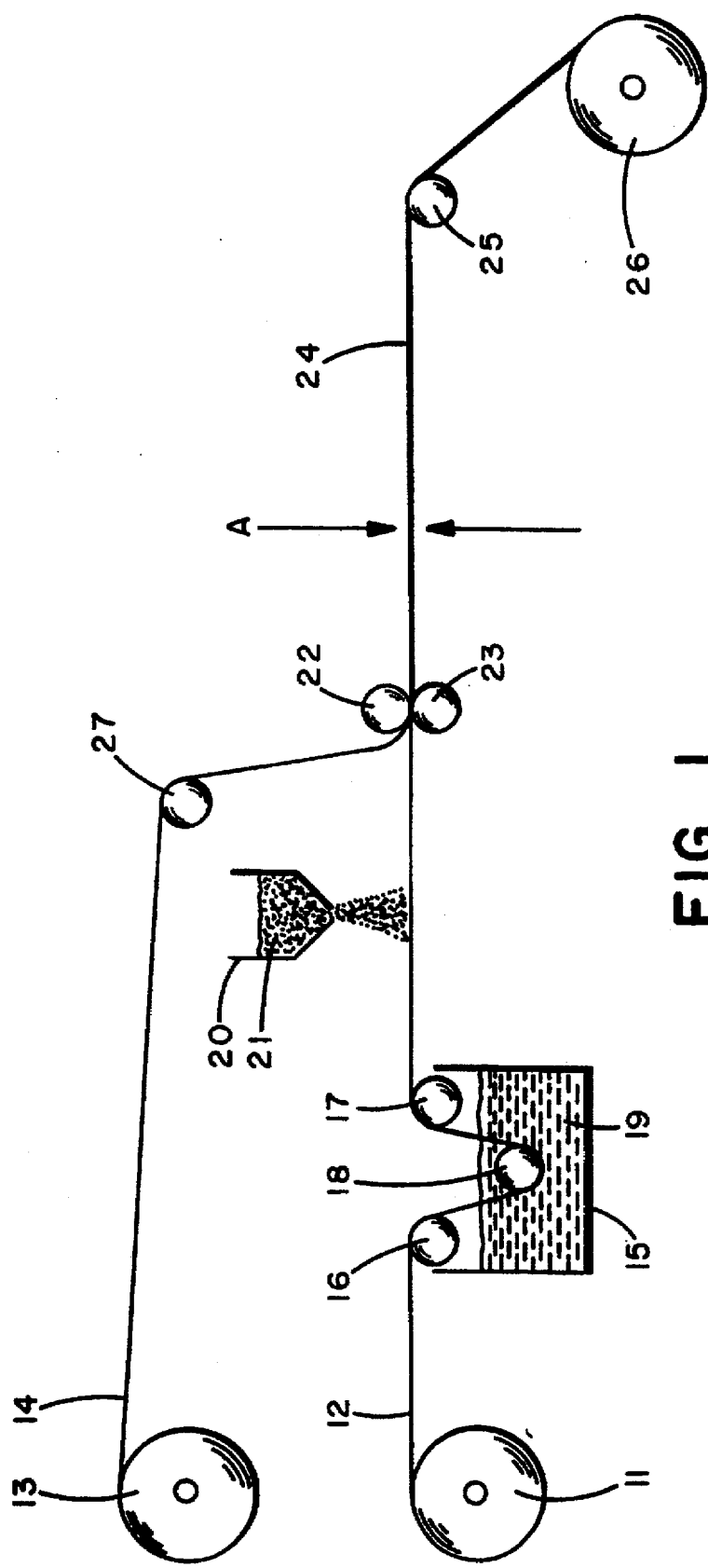
FIG. 1 is a schematic diagram showing how a basic component of the invention is made and also the resulting component which is a feature of the invention.

Reference is made now to FIG. 1 which shows an apparatus 10 for practicing a method to produce a product in accordance with the invention.

A first roll 11 has mounted thereon a sheet or strip 12 of pre-bonded carded fiber such as for example cotton or rayon of a thickness which may be in the range of 0.001 to 0.003" on bended form. The strips 12 and 14 hereinafter mentioned may have voids therein as disclosed in U.S. Pat. No. 2,284,738 and will hereinafter be discussed. The binder may by a polyvinyl acetate or alcohol or any other suitable binder.

A second roll 13 has mounted thereon a second sheet of similar carded and bonded fiber 14. The first sheet or strip 12 is passed through a liquid receptacle 15 which in the first instance will contain a liquid binder such as a casein based adhesive. The strip 12 passes over idler rollers 16 and 17 and beneath roller 18 into a bath of the liquid 19 which is the binder. The first sheet 12 then passes beneath a hopper 20 or other distributing device which contains an abrasive material 21 which will uniformly dispense abrasive particles 21 as shown dropping in dots onto the binder on strip 12. The abrasive particles are preferably aluminum oxide or silicon carbide, but may be any other abrasive. The abrasive particles are in a range of grit size #16–#320 dependent on the ultimate use of the finished product. The major cross dimension of the abrasive particles is greater than the thickness of strips 12 and 14 for reasons hereinafter explained and made apparent. The hopper will be set with an opening to distribute abrasive in a given concentration per unit area on the strip 12 with the binder thereon. The concentration per unit area and the size of the particles will be determined by the specifications of the finished product. The strip 12 then passes a pair of compression nip rolls 22 and 23. After passing rolls 22 and 23 the strip may be subjected to air jets identified by arrows A to dry any excess moisture. At the same time strip 14 passing over idler 25 leading to nip rolls 22 and 23 is compressively engaged by the nip rolls no sandwich the binder 19 and the abrasive particles 15 between the strips 12 and 14. At this point the binder will saturate and fill the space between the strips 12 and 14 as hereinafter exemplified.

The strips 12 and 14 may be purchased as prepared strips of bonded carded fibre or alternatively may come directly from lines where the carded fibre is passed through and retained in a binder to provide the strips 12 and 14.

Figure 2:
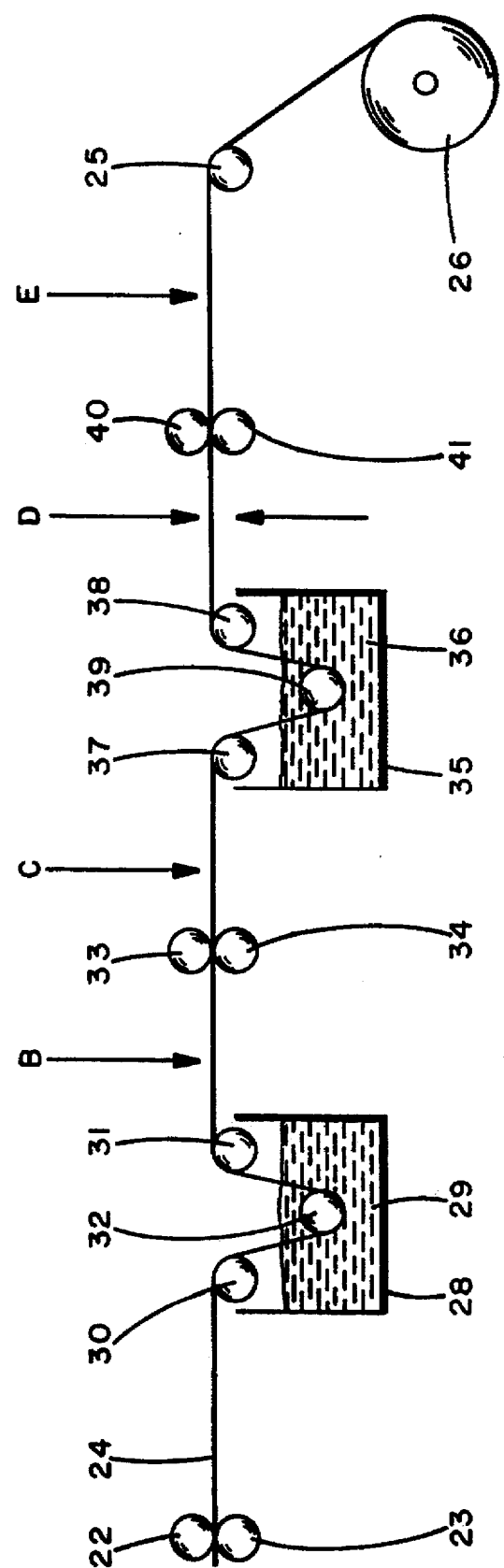
FIG. 2 is a view similar to FIG. 1 showing an optional embodiment of FIG. 1.

Dependent on the ultimate product the strip 24 could be passed to other coating apparati as shown in FIG. 2 for saturation with a rubber, either synthetic or natural, and further to a coating station for further saturation with a thermosetting resin. In passing through the rubber, there is saturation of layer 24 and the rubber will combine with and displace some of the binder 19. In such case the strip 24 would merely be passed to liquid receptacles such as receptacle 15 to receive the appropriate coatings of rubber or for a further coating of a thermosetting resin and then rolled up on a take up roller.

FIG. 2 exemplifies an extension of the process shown in FIG. 1. Here, the strip 24 after leaving pinch rolls 22 and 23 is moved to a receptacle 28 containing a liquid rubber 29 and is guided by rolls 30, 31, and 32. Further abrasion may be deposited on strip 24 at a location indicated by arrow B if desired. However, it is preferred that all abrasive material be uniformity deposited by hopper 20. Rubber saturated strip 24 then passes between pinch rolls 33 and 34 to remove any excess rubber and provide a uniform saturation of the rubber on strip 24. At this point drying air may be directed on the strip 24 to remove any excess moisture, as indicated by the arrows C.

Prior to passing compression nip rolls 33, 34 additional abrasive may be deposited from a hopper at at location indicated by the arrow c.

Strip 24 is guided into a receptacle 35 containing a thermosetting resin 36 by rolls 37, 35, and 39, and through another set of pinch rolls 40 and 41 which serve the same purpose as pinch rolls 33 and 34 for the rubber. Drying air may be applied to the layer 24 after rolls 40 and 41 to dry excess moisture at a point indicated by the arrows E. Thereafter the strip 24 is guided to the take-up roll 26.

The resin also saturates the layer 24 and may displace or combine with the other adhesives.

In the alternative the take up roller 26 could be substituted for the roller 11 and the receptacle 15 changed to have rubber placed therein. At this time the strip 14 would not be introduced. Thereafter another substitution could be made for the rubber coated strip 24 from take up roller 26 and the thermosetting resin placed in container 15.

It is to be understood that the application of rubber and the application of a thermosetting resin may be in the alternative. The application of rubber is to impart flexibility, while the application of the thermosetting resin is to impart hardness. There maybe a compromise therebetween to achieve the desired product.

As previously stated this may be done either by changing the take up roller to a pay out roller 11 or by continuing the line and continuing the application of the rubber or the rubber and the resin at a point between nip rolls 22 and 23 and take up roller 26 as shown in FIG. 2 and as previously described.

Thereafter the strip 24 will be cut in sections. Preferably each adjacent section is turned 90 degrees to the next adjacent section. Then the sections are placed in a press and laminated under pressure to adhere the various layers to each other prior to forming a wheel, stick, pull or point, as hereinafter exemplified.

Figure 3:
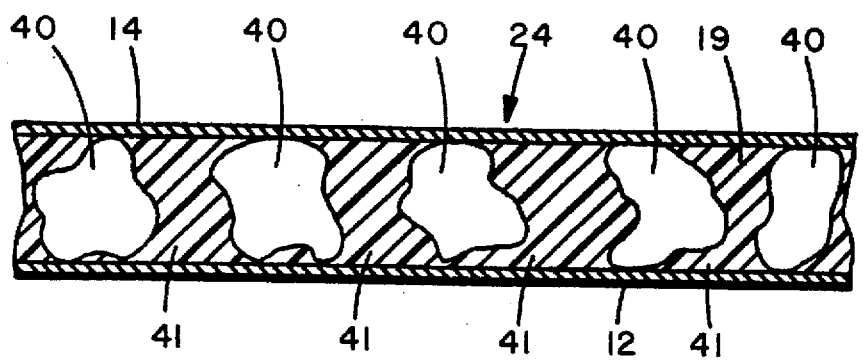
FIG. 3 is a sectional view of a portion of the component or layer which is made in accordance with FIG. 1.

A section of strip 24 as it leaves roller 22 and 23 is shown in FIG. 3. Particles 40 of the abrasive material 21 are shown between the strips 12 and 14 saturated with the binder 19 therebetween. The are spaces or interstices 41 between the abrasive particles 40. The abrasive particles 40 are of greater dimension than the thickness of strips 12 and 14 and may range in grit size from #16 to #320.

Figure 4:
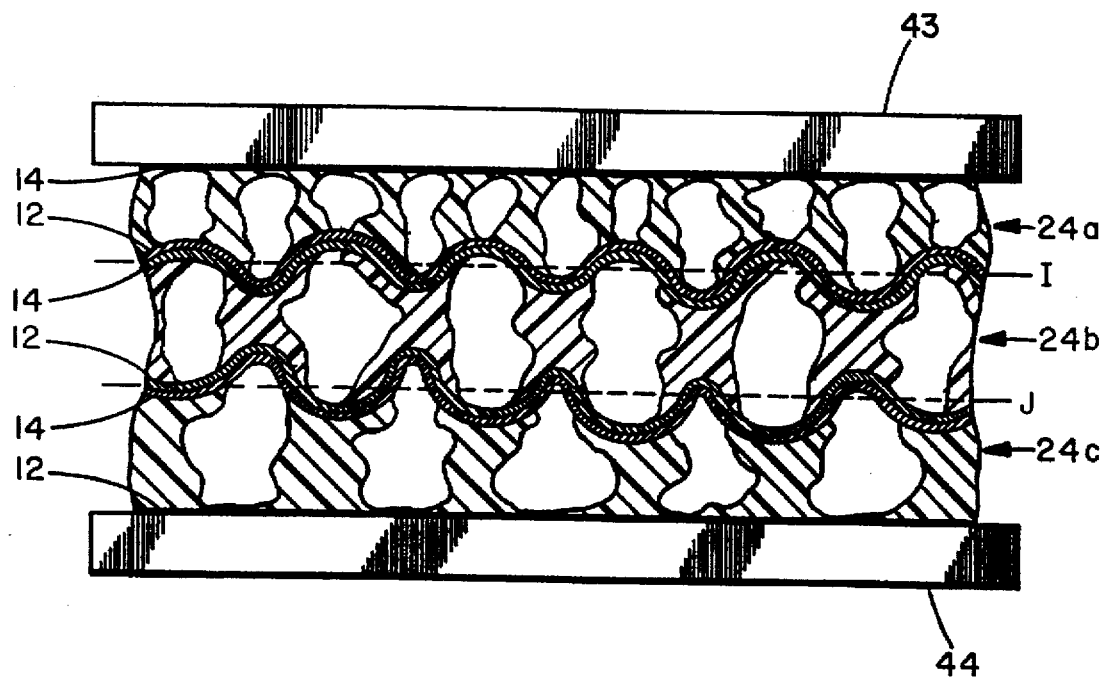
FIG. 4 is a Sectional view through a lamination of layers of the components made in accordance with FIGS. 1 or 2 showing the interlocking relationship of the various layers.

The strip 24 which may vary in width up to forty-eight inches (48") or more is then cut into sections as exemplified in FIG. 4 by the sections 24a, 24b, and 24c and placed between pressure platens 43 and 44. Only three sections are shown in FIG. 4 for simplicity of illustration, and to exemplify the invention. The final product may include many layers 24.

Neither FIGS. 3 or 4 are to scale and are merely exemplary.

The platens 43 and 44 are heated to cure the thermosetting resin, if such resin is utilized.

As the layers 24a–24c are compressed by the platens 43 and 44 the strips 12 and 14 and the resultant layers 24a–24c will flex and bend with the abrasive particles of one of the strips entering the interstices between the abrasive particles of adjacent layers.

The fiber content of the resultant product provides a buffing action as well as providing a carrier or base for the abrasive particles as well as tensile strength. The rubber coating contributes flexibility and resiliency to the individual layers 24 as well as the completed product and bond strength. The thermosetting resin contributes to the desired degree of hardness, and bond strength.

In the final lamination of a product under heat and pressure, the rubber 29 and resin 36 may displace or combine with the binder. The amount of rubber and the amount of resin are chosen to provide a compromise between flexibility and rigidity.

This is exemplified in FIG. 4 by the imaginary lines I and J which show the interlocking of the abrasive particles of layers 24a with the abrasive particles of layer 24b, and additionally the interlocking of the abrasives particles of layers 24b with those of layers 24c. The interlocking effect may be greater than that shown in FIG. 4.

It will be understood that FIG. 4 is merely exemplary for three layers of the product. A great multiplicity of layers 24 may be utilized for the final product.

In compressing as shown in FIG. 4 the final product maybe compressed 65–80% of the thickness of the total individual layers 24, leaving 20–35% of total individual layers.

As pressure is applied by the platens the abrasive particles of each strip enter the interstices between the particles of adjacent strips and the strips 12 and 14 deform accordingly as shown on either side of the imaginary lines I and J. This provides a greater interlocking of the abrasive particles of each layer 24 and greater tensile strength.

A disc may be formed from a laminate product by punching, pressing or cutting with a saw.

Figure 5:
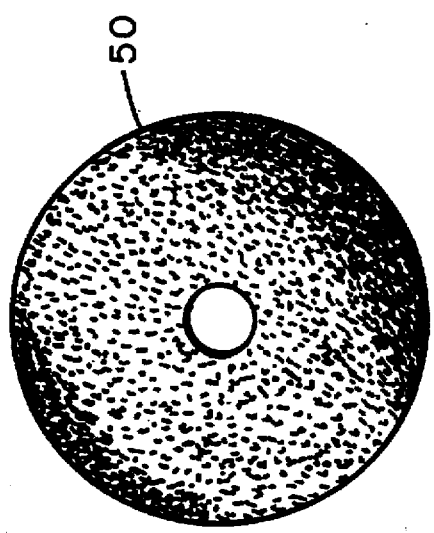

FIG. 5 is a view of a grinding disc 50 made in accordance with the invention where a multiplicity of laminations 24 is utilized to make the final product, and the final product is to be used as a grinding wheel or disc.

Figure 6:
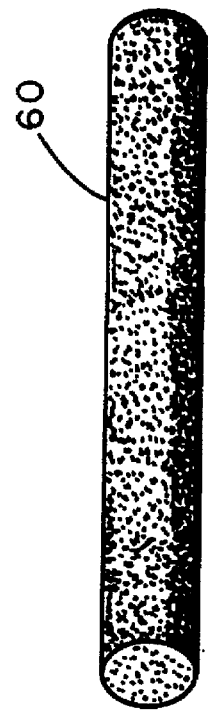

FIG. 6 is exemplary of an abrasive stick 60 shown as round, but which also may be rectangular and which is cut from a product embodying the invention.

Figure 7:
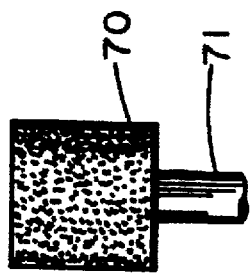
FIG. 5–7 are side elevations of abrasive devices which may be made with products of the invention.

FIG. 7 is a view of a grinding wheel 70 which maybe formed from a product embodying the invention having a turning shaft 71 thereon. This product is formed by turning a blank of the laminated product into a circular wheel.

Figure 8:
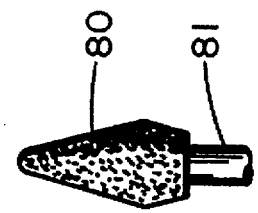

FIG. 8 is a view of grinding point 80 mounted on a shaft 81 made from a laminated product embodying the invention. This product is formed by turning while grinding a blank of the laminated product.

The invention may be utilized to produce various abrasive tools as shown and described.

It may thus be seen that the objects of the invention set forth, as well as those made apparent from the foregoing description, are efficiently attained. While preferred embodiments of the invention has been set forth for purposes of disclosure, modification to the disclosed embodiments of the invention, as well as other embodiments thereof, may occur to those skilled in the art. Accordingly, the appended claims are intended to cover all embodiments of the invention and modifications to the disclosed embodiments which do not depart from the spirit and scope of the invention.

What is claimed is:

1. A method of forming an abrasive article which comprises the steps of providing two strips of fiber, conveying a first of said strips through a binder, depositing abrasive particles of a major cross section dimension greater than the thickness of said strips on said first strip after said first strip is conveyed through the binder, said abrasive particle having interstices therebetween, providing a pair of nip rolls, directing said first strip through said nip rolls while directing said second strip through said nip rolls over the deposited abrasive particles whereby said first and second strips are compressed and adhered together with the abrasive particles between said first and second strip into a resulting third strip, separating said third strip into sections, and laminating a plurality said sections under sufficient pressure to force the abrasive particles of said plurality of sections into the interstices of the abrasive particles of an adjacent section.

2. The method of claim 1 including the further step of applying liquid rubber to both sides of said third strip prior to said step of separating.

3. The method of claim 1 further including the steps of applying liquid rubber to both sides of said third strip and applying a thermosetting resin to both sides of said third strip prior to separating said third strip into sections, and said step of laminating including subjecting the sections, laminated to heat to cure said resin.

4. The method of claim 1 further comprising the step of applying a thermosetting resin to both sides of said third strip and said step of laminating includes the application of heat to cure said resin.

5. The method of claim 1 where the step of separating includes cutting said third strip into said sections and said step of laminating includes overlaying a plurality of said sections and the laminating pressure provides an interlock between said sections in a direction essentially perpendicular to the direction or the laminating pressure when the abrasive particles of a section enter the interstices of abrasive particles of adjacent sections.

6. The method of claim 5 wherein a liquid rubber is deposited on said third strip prior to lamination.

7. The method of claim 5 where a thermosetting resin is deposited on said third strip prior to lamination and said laminating is performed under pressure and heat to cure said thermosetting resin.

8. The method of claim 6 wherein additional abrasive particles are applied to said third strip after application of said rubber.

9. The method of claim 7 wherein additional abrasive particles are applied to said third strip after application of said thermosetting resin.

10. The method of claim 5 including the further step of forming a grinding tool from said laminated sections.

11. The method of making an abrasive article which comprises the steps of sandwiching abrasive particles with interstices therebetween between two sheets of fiber with an adhesive where the major cross-section dimension of the abrasive particles is greater than the thickness of the sheets to produce a second sheet, coating a surface of a plurality of said second sheets with an adhesive, stacking a plurality of said second sheets and laminating the stacked second sheets under sufficient pressure to force the abrasive particles of the second sheets to penetrate the interstices between abrasive particles of adjacent second sheets.

12. The method of claim 11 where one of said two sheets is coated with an adhesive on both sides prior to said sandwiching step and said step of coating a surface of said second sheets includes the step of coating with one or both of liquid rubber and a thermosetting resin and said step of laminating also includes the application of heat where a thermosetting resin is utilized.

13. The method of claim 11 wherein adhesive is applied to one of said two strips of fiber on both sides thereof before sandwiching said abrasive particles between said first and a second strip of fiber to form a resultant second strip and said second strip is cut into said sections with adhesive on the outside of one surface thereof.

14. The method of claim 13 where said strips are of pre-bonded carded fiber.

* * * * *